(12) United States Patent
Hori et al.

(10) Patent No.: US 12,022,549 B2
(45) Date of Patent: Jun. 25, 2024

(54) TERMINAL DEVICE, BASE STATION DEVICE, AND METHOD

(71) Applicants: SHARP KABUSHIKI KAISHA, Sakai (JP); FG Innovation Company Limited, Tuen Mun (HK)

(72) Inventors: Takako Hori, Sakai (JP); Shohei Yamada, Sakai (JP); Hidekazu Tsuboi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 413 days.

(21) Appl. No.: 17/277,885

(22) PCT Filed: Sep. 17, 2019

(86) PCT No.: PCT/JP2019/036418
§ 371 (c)(1),
(2) Date: Jun. 22, 2021

(87) PCT Pub. No.: WO2020/059720
PCT Pub. Date: Mar. 26, 2020

(65) Prior Publication Data
US 2021/0352751 A1 Nov. 11, 2021

(30) Foreign Application Priority Data
Sep. 20, 2018 (JP) .................. 2018-176141

(51) Int. Cl.
*H04W 4/00* (2018.01)
*H04W 76/19* (2018.01)
*H04W 76/30* (2018.01)

(52) U.S. Cl.
CPC .......... *H04W 76/19* (2018.02); *H04W 76/30* (2018.02)

(58) Field of Classification Search
CPC .............................. H04W 76/19; H04W 76/30
(Continued)

(56) References Cited

U.S. PATENT DOCUMENTS

| 11,375,563 B2 * | 6/2022 | Hori | H04W 76/19 |
| 11,375,571 B2 * | 6/2022 | Hori | H04W 76/30 |

(Continued)

FOREIGN PATENT DOCUMENTS

| CN | 104704871 A | 6/2015 |
| CN | 106063360 A | 10/2016 |
| RU | 2665881 C1 | 9/2018 |

OTHER PUBLICATIONS

3GPP TS 36.323, "3rd Generation Partnership Project; Technical Specification Group Radio Access Network; Evolved Universal Terrestrial Radio Access (E-UTRA); Packet Data Convergence Protocol (PDCP) specification (Release 15)", V15.0.0 (Jul. 2018).
(Continued)

Primary Examiner — Marceau Milord
(74) Attorney, Agent, or Firm — ScienBiziP, P.C.

(57) ABSTRACT

The present disclosure provides a technology pertaining to a terminal device, a base station device, a method and an integrated circuit which can reduce the complexity of protocol processing and perform efficient communications. The terminal device includes: a receiving unit which receives an RRC connection reconfiguration message from the base station device; and a processing unit, wherein, when information for indicating that full configuration is applied is included in the RRC connection reconfiguration message, on the basis of the terminal device performing an E-UTRA/5GC or NGEN-DC, performs an RLC entity re-establishment, an NR PDCP entity release, an RLC entity release, a logical channel release, and a DRB identifier on a DRB which corresponds to each DRB identifier set by the termi- (Continued)

nal device release, and performs an SDAP entity notification, which corresponds to the DRB, of a release of the DRB.

6 Claims, 10 Drawing Sheets

(58) Field of Classification Search
USPC .......................................... 370/328, 329, 342
See application file for complete search history.

(56) References Cited

U.S. PATENT DOCUMENTS

| | | | |
|---|---|---|---|
| 11,382,165 B2* | 7/2022 | Hori ..................... | H04W 76/20 |
| 2010/0284299 A1* | 11/2010 | Bi ......................... | H04W 48/16 |
| | | | 370/329 |
| 2011/0075675 A1* | 3/2011 | Koodli .................. | H04M 15/41 |
| | | | 370/401 |
| 2014/0198734 A1 | 7/2014 | Yamada et al. | |
| 2015/0271861 A1* | 9/2015 | Li .......................... | H04W 76/14 |
| | | | 455/552.1 |
| 2016/0095018 A1* | 3/2016 | Vajapeyam ........... | H04W 16/14 |
| | | | 370/331 |
| 2016/0227553 A1 | 8/2016 | Kim et al. | |
| 2016/0381517 A1 | 12/2016 | Kim et al. | |
| 2017/0013668 A1 | 1/2017 | Chang et al. | |
| 2017/0310497 A1* | 10/2017 | Kim ...................... | H04W 72/30 |
| 2017/0311049 A1* | 10/2017 | Kwak .................... | H04H 20/71 |
| 2017/0353896 A1* | 12/2017 | Nath ..................... | H04W 76/19 |
| 2018/0084601 A1* | 3/2018 | Dhanapal .............. | H04W 76/30 |
| 2018/0098311 A1 | 4/2018 | Hong et al. | |
| 2019/0037634 A1* | 1/2019 | Kadiri ................... | H04W 76/18 |
| 2019/0207730 A1* | 7/2019 | Park ..................... | H04J 13/0055 |

OTHER PUBLICATIONS

3GPP TS 36.321, "3rd Generation Partnership Project; Technical Specification Group Radio Access Network; Evolved Universal Terrestrial Radio Access (E-UTRA); Medium Access Control (MAC) protocol specification (Release 15)", V15.2.0 (Jul. 2018).
5G architecture options—full set, Joint RAN/SA meeting |Jun. 14, 2016, Busan Deutsche Telekom AG, RP-161266.
3GPP TS 37.340, "3rd Generation Partnership Project; Technical Specification Group Radio Access Network; Evolved Universal Terrestrial Radio Access (E-UTRA) and NR; Multi-connectivity; Stage 2 (Release 15)", V15.2.0 (Jun. 2018).
3GPP TS 38.300, "3rd Generation Partnership Project; Technical Specification Group Radio Access Network; NR; NR and NG-RAN Overall Description; Stage 2 (Release 15)", V15.2.0 (Jun. 2018).
3GPP TS 38.331, "3rd Generation Partnership Project; Technical Specification Group Radio Access Network; NR; Radio Resource Control (RRC) protocol specification (Release 15)", V15.2.1 (Jun. 2018).
3GPP TS 38.323, "3rd Generation Partnership Project; Technical Specification Group Radio Access Network; NR; Packet Data Convergence Protocol (PDCP) specification (Release 15)", V15.2.0 (Jun. 2018).
3GPP TS 38.322, "3rd Generation Partnership Project; Technical Specification Group Radio Access Network; NR; Radio Link Control (RLC) protocol specification (Release 15)", V15.2.0 (Jun. 2018).
3GPP TS 38.321, "3rd Generation Partnership Project; Technical Specification Group Radio Access Network; NR; Medium Access Control (MAC) protocol specification (Release 15)", V15.2.0 (Jun. 2018).
3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 14)", V14.3.0 (Mar. 2017).
3GPP TS 23.502, "3rd Generation Partnership Project; Technical Specification Group Services and System Aspects; Procedures for the 5G System; Stage 2 (Release 15)", V15.2.0 (Jun. 2018).
3GPP TS 37.324, "3rd Generation Partnership Project; Technical Specification Group Radio Access Network; E-UTRA and NR; Service Data Adaptation Protocol (SDAP) specification (Release 15)", V15.0.0 (Jun. 2018).
NTT DOCOMO, Inc. "New WID on New Radio Access Technology", RP-170855, 3GPP TSG RAN Meeting #75 Dubrovnik, Croatia, Mar. 6-9, 2017.
3GPP TS 23.501, "3rd Generation Partnership Project; Technical Specification Group Services and System Aspects; System Architecture for the 5G System; Stage 2 (Release 15)", V15.2.0 (Jun. 2018).
3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", V15.2.0 (Jun. 2018).
3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 15)", V15.2.1 (Jun. 2018).
3GPP TS 36.322, "3rd Generation Partnership Project; Technical Specification Group Radio Access Network; Evolved Universal Terrestrial Radio Access (E-UTRA); Radio Link Control (RLC) protocol specification (Release 15)", V15.1.0 (Jul. 2018).
Intel Corporation, Capture NR agreements into 36.331 for E-UTRA connected to 5GC [online], 3GPP TSG RAN WG2 #103 R2-1813139, Aug. 24, 2018, [retrieved on Oct. 10, 2019].
Ericsson, Flow based QoS framework for LTE connected to 5GC [online], 3GPP TSG RAN WG2 #103 R2-1811163, Aug. 9, 2018, [retrieved on Oct. 11, 2019].
Qualcomm Incorporated, "Addition of NR RRC TC—PSCell addition, modification and release/Split DRB/EN-DC", R5-182893, 3GPP TSG5 RAN meeting #79, Busan, South Korea, May 21-25, 2018(May. 23, 2018).
Zushen Liu et al., "Research on the key technologies of LTE-advanced uu monitoring and analysis", Journal of electronic measurement and instrumentation, vol. 31, No. 12, 2017-12-15.

* cited by examiner

```
<Omission>
RRCConnectionReconfiguration ::=   SEQUENCE {
    <Abbreviation>
    radioResourceConfigDedicated    RadioResourceConfigDedicated    OPTIONAL,
    <Abbreviation>
    fullConfig                      ENUMEFATED {true}               OPTIONAL,
    <Abbreviation>
}
RadioResourceConfigDedicated ::=   SEQUENCE {
    <Abbreviation>
    srb-ToAddModList                SRB-ToAddModList                OPTIONAL,
    drb-ToAddModList                DRB-ToAddModList                OPTIONAL,
    <Abbreviation>
}
<Abbreviation>
SRB-ToAddModList ::= SEQUENCE (SIZE (1..2)) OF SRB-ToAddMod
SRB-ToAddMod ::=    SEQUENCE {
    srb-Identity                    INTEFER (1..2),
    <Abbreviation>
}
```

Fig. 7

```
<Abbreviation>
DRB-ToAddModList ::=SEQUENCE (SIZE (1..maxDRB)) OF DRB -ToAddMod
DRB-ToAddMod ::=    SEQUENCE {
    eps-BearerIdentity       INTEGER(0..15)        OPTIONAL,
    drb-Identity             DRB-Identity.
    pdcp-Config              PDCP-Config           OPTIONAL,
    rlc-Config               RLC-Config            OPTIONAL,
    logicalChannelIdentity   INTEGER(3..10)        OPTIONAL,
    logicalChannelConfig     LogicalChannelConfig  OPTIONAL,
<Abbreviation>
}
<Abbreviation>
DRB-Identity ::=    INTEGER (1..32)
<Abbreviation>
}
<Omission>
```

Fig. 8

TERMINAL DEVICE, BASE STATION DEVICE, AND METHOD

FIELD

The present disclosure relates to a terminal device, a base station device and methods thereof. The present disclosure claims the benefit of and priority to Japanese Patent Application No. 2018-176141 ("the '141 application"), filed on Sep. 20, 2018. The content(s) of the '141 application are fully incorporated herein by reference for all purposes.

BACKGROUND

In the third generation partnership project (3rd Generation Partnership Project: 3GPP), the radio access methods and radio networks of cellular mobile communications (hereinafter, referred to as "Long Term Evolution (LTE: registered trademark)" or "Evolved Universal Terrestrial Radio Access: EUTRA") and a core network (hereinafter, referred to as "Evolved Packet Core: EPC") are being considered.

Furthermore, in 3GPP, as a radio access system and radio network technology for the fifth generation (5G: 5 Generation) cellular system, for the LTE-Advanced Pro of LTE extension technology and for the NR (New Radio technology) of new radio access technology, related technologies have been studied and standards have been established (Non-Patent Literature 1). Additionally, the 5GC (5 Generation Core Network) of a core network for the fifth-generation cellular systems is being studied (Non-Patent Literature 2).

PRIOR ART DOCUMENTS/NON-PATENT LITERATURE

Non-Patent Literature 1: 3GPP RP-170855, "Work Item on New Radio (NR) Access Technology."
Non-Patent Literature 2: 3GPP TS 23.501 v15.2.0, "System Architecture for the 5G System; Stage 2."
Non-Patent Literature 3: 3GPP TS 36.300 v15.2.0, "Evolved Universal Terrestrial Radio Access (E-UTRA) and Evolved Universal Terrestrial Radio Access Network (E-UTRAN); Overall description; Stage 2."
Non-Patent Literature 4: 3GPP TS 36.331 v15.2.1, "Evolved Universal Terrestrial Radio Access (E-UTRA); Radio Resource Control (RRC); Protocol specifications."
Non-Patent Literature 5: 3GPP TS 36.323 v15.0.0, "Evolved Universal Terrestrial Radio Access (E-UTRA); Packet Data Convergence Protocol (PDCP) specification."
Non-Patent Literature 6: 3GPP TS 36.322 v15.1.0, "Evolved Universal Terrestrial Radio Access (E-UTRA); Radio Link Control (RLC) protocol specification."
Non-Patent Literature 7: 3GPP TS 36.321 V15.2.0, "Evolved Universal Terrestrial Radio Access (E-UTRA); Medium Access Control (MAC) protocol specification."
Non-Patent Literature 8: 3GPP TS 37.340 v15.2.0, "Evolved Universal Terrestrial Radio Access (E-UTRA) and NR; Multi-Connectivity; Stage 2."
Non-Patent Literature 9: 3GPP TS 38.300 V15.2.0, "NR; NR and NG-RAN Overall description; Stage 2."
Non-Patent Literature 10: 3GPP TS 38.331 v15.2.1, "NR; Radio Resource Control (RRC); Protocol specifications."
Non-Patent Literature 11: 3GPP TS 38.323 v15.2.0, "NR; Packet Data Convergence Protocol (PDCP) specification."
Non-Patent Literature 12: 3GPP TS 38.322 v15.2.0, "NR; Radio Link Control (RLC) protocol specification."
Non-Patent Literature 13: 3GPP TS 38.321 v15.2.0, "NR; Medium Access Control (MAC) protocol specification."
Non-Patent Literature 14: 3GPP TS 23.401 v14.3.0, "General Packet Radio Service (GPRS) enhancements for Evolved Universal Terrestrial Radio Access Network (E-UTRA) access."
Non-Patent Literature 15: 3GPP TS 23.502 v15.2.0, "Procedure for 5G System; Stage 2."
Non-Patent Literature 16: 3GPP TS 37.324 v15.0.0, "NR; Service Data Adaptation Protocol (SDAP) specification."
Non-Patent Literature 17: 3GPP RP-161266, "5G Architecture Options-Full Set."

Problems to be Addressed

The following mechanism is studied as part of NR technical studies: cells of both E-UTRA and NR RAT (Radio Access Technology) are grouped for each RAT and assigned to the UEs, and the structure that a terminal device and one or more base station devices utilize for communication with each other (MR-DC: Multi-RAT Dual Connectivity) (Non-Patent Literature 8).

However, the formats and functions of the communication protocols used for E-UTRA and NR are different and protocol processing is more complicated than the dual connectivity in the conventional LTE using only E-UTRA as the RAT such that communications between the base station device and the terminal device cannot be performed efficiently. The present disclosure addresses these issues by providing a terminal device, a base station device, a method used for the terminal device and a terminal device, and an integrated circuit installed on a computer capable of efficiently performing communications with a base station device that may reduce the complexity of protocol processing and perform efficient communications.

SUMMARY

One implementation of the present invention has been completed in view of the above circumstances. There is provided a terminal device, a base station device, a method used for the terminal device and a terminal device, and an integrated circuit installed on a computer capable of efficiently performing communications with a base station device.

Technology Aspects

For addressing the above problems, an implementation of the present disclosure is provided with the following details. There In one aspect of the present disclosure a terminal device that communicates with a base station device is provided. The terminal device comprises a receiving unit that receives an RRC connection reconfiguration message from the base station device; and a processing unit that determines that the RRC connection reconfiguration message includes information indicating that a full configuration is applied; and performs a release process when the terminal device performs an Evolved Universal Terrestrial Radio Access (E-UTRA)/5G core network (5GC) or NG-RAN E-UTRA-NR Dual Connectivity (NGEN-DC). The release process comprises for each data radio bearer (DRB) corresponding to a DRB identifier set by the terminal device, performing a Radio Link Control (RLC) entity re-establishment, a New Radio (NR) PDCP entity release, an RLC entity release, a logical channel release, a DRB identifier release, and notification of a Service Data Adaptation Protocol (SDAP) entity corresponding to the DRB of the DRB release.

In another aspect of the present disclosure a terminal device that communicates with a base station device is provided. The terminal device comprises a receiving unit that receives an RRC connection reconfiguration message from the base station device, the RRC connection configuration message set to an Evolved Packet System (EPS) bearer identifier value of the terminal device; and a processing unit that determines that the RRC connection reconfiguration message includes information indicating that a full configuration is applied; and performs a release process when the terminal device does not perform an E-UTRA/5GC or NGEN-DC. The release process comprises for each data radio bearer (DRB) corresponding to the EPS bearer identifier value and when the DRB is set to a E-UTRA Packet Data Convergence Protocol (PDCP) entity, performing a Radio Link Control (RLC) protocol entity re-establishment and a New Radio (NR) PDCP entity release and, after an E-UTRA PDCP entity release or the NR PDCP entity release, performing an RLC entity release, a logical channel release and a DRB identifier release; and for each DRB not corresponding to the EPS bearer identifier value, performing a DRB release.

In another aspect of the present disclosure, a method of a terminal device communicating with a base station device is provided. The method comprises receiving a Radio Resource Control (RRC) connection reconfiguration message from the base station device; determining that the RRC connection reconfiguration message includes information indicating that a full configuration is applied; and performing a release process when the terminal device performs an Evolved Universal Terrestrial Radio Access (E-UTRA)/5G core network (5GC) or NG-RAN E-UTRA-NR Dual Connectivity (NGEN-DC). The release process comprises for each data radio bearer (DRB) corresponding to a DRB identifier set by the terminal device, performing an RLC entity re-establishment and a New Radio (NR) PDCP entity release, a RLC entity release, a logical channel release, a DRB identifier release, and notification of a Service Data Adaptation Protocol (SDAP) entity corresponding to the DRB of the DRB release.

In another aspect of the present disclosure, a method of a a terminal device communicating with a base station device is provided. receiving a Radio Resource Control (RRC) connection reconfiguration message from the base station device, the RRC connection configuration message set to an Evolved Packet System (EPS) bearer identifier value of the terminal device; determining that the RRC connection reconfiguration message includes information indicating that a full configuration is applied; and performing a release process when the terminal device does not perform an Evolved Universal Terrestrial Radio Access (E-UTRA)/5G core network (5GC) or NG-RAN E-UTRA-NR Dual Connectivity (NGEN-DC). The release process comprises for each data radio bearer (DRB) corresponding to the EPS bearer identifier value and when the DRB is set to a E-UTRA Packet Data Convergence Protocol (PDCP) entity, performing a Radio Link Control (RLC) protocol entity re-establishment and a New Radio (NR) PDCP entity release and, after an E-UTRA PDCP entity release or the NR PDCP entity release, performing an RLC entity release, a logical channel release and a DRB identifier release; and for each DRB not corresponding to the EPS bearer identifier value, performing a DRB release.

In another aspect of the present disclosure, A base station device that communicates with a terminal device, comprising: a transmitting unit that transmits a Radio Resource Control (RRC) connection reconfiguration message to the terminal device; and, a processing unit that causes the terminal device to perform processes according to the RRC connection reconfiguration message, the processes are the following, that are, when the RRC connection reconfiguration message includes information indicating that full configuration is applied, on the basis that the terminal device performs an Evolved Universal Terrestrial Radio Access (E-UTRA)/5GC or NG-RAN E-UTRA-NR Dual Connectivity (NGEN-DC), for each data radio bearer (DRB) corresponding to a DRB identifier set by the terminal device, performing a New Radio (NR) Packet Data Convergence Protocol (PDCP) entity release, a Radio Link Control (RLC) entity release, a logical channel release, a DRB identifier release, and a notification of a Service Data Adaptation Protocol (SDAP) entity corresponding to the DRB of the DRB release, and performing a RLC entity re-establishment.

In another aspect of the present disclosure, a base station device that communicates with a terminal device, comprising: a transmitting unit that transmits a Radio Resource Control (RRC) connection reconfiguration message to the terminal device; and, a processing unit that causes the terminal device to perform processes according to the RRC connection reconfiguration message, the processes are the following, that are, when the RRC connection reconfiguration message includes information indicating that full configuration is applied, on the basis that the terminal device does not perform a Evolved Universal Terrestrial Radio Access (E-UTRA)/5GC or NG-RAN E-UTRA-NR Dual Connectivity (NGEN-DC), for each data radio bearer (DRB) corresponding to an Evolved Packet System (EPS) bearer identifier value included in the RRC connection reconfiguration message that is set in the EPS bearer identifier value of the terminal device, performing an E-UTRA PDCP entity release or the NR PDCP entity release, performing a RLC entity release, a logical channel release, and a DRB identifier release, and performs a Radio Link Control (RLC) entity re-establishment, for each DRB corresponding to the EPS bearer identifier value not included in the RRC connection reconfiguration message that is set in the EPS bearer identifier value of the terminal device, performing a DRB release.

The aspects of the present disclosure may be realized by a system, a device, a method, an integrated circuit, a computer program or a recording medium, or may be realized by any combinations of a system, a device, a method, an integrated circuit, a computer program or a recording medium.

EFFECTS OF THE INVENTION

Brief Description of the Drawings

FIG. 7 illustrates a first portion of ASN.1 (Abstract Syntax Notation One) and information related to the radio bearer setting in an implementation of the present disclosure.

FIG. 8 illustrates a second portion of the ASN.1 illustrated in FIG. 7.

DESCRIPTION

Hereinafter, implementations of the present disclosure will be disclosed in detail with reference to the drawings.

LTE (and LTE-A Pro) and NR may be defined as different RATS. Furthermore, NR may be defined as a technology included in LTE. LTE may be defined as a technology included in NR. Furthermore, LTE connectable with NR via Multi RAT Dual connectivity or LTE connectable with a 5G core network (5GC) may be distinguished from conventional LTE. This implementation may also be applied to NR, LTE and other RAT. The following descriptions will be made with terms related to LTE and NR, but it may also be applied in other technologies with other terms. Furthermore, the tem E-UTRA in the present implementation may be replaced with the term LTE, and the term LTE may be replaced with the term E-UTRA.

Figure 1:
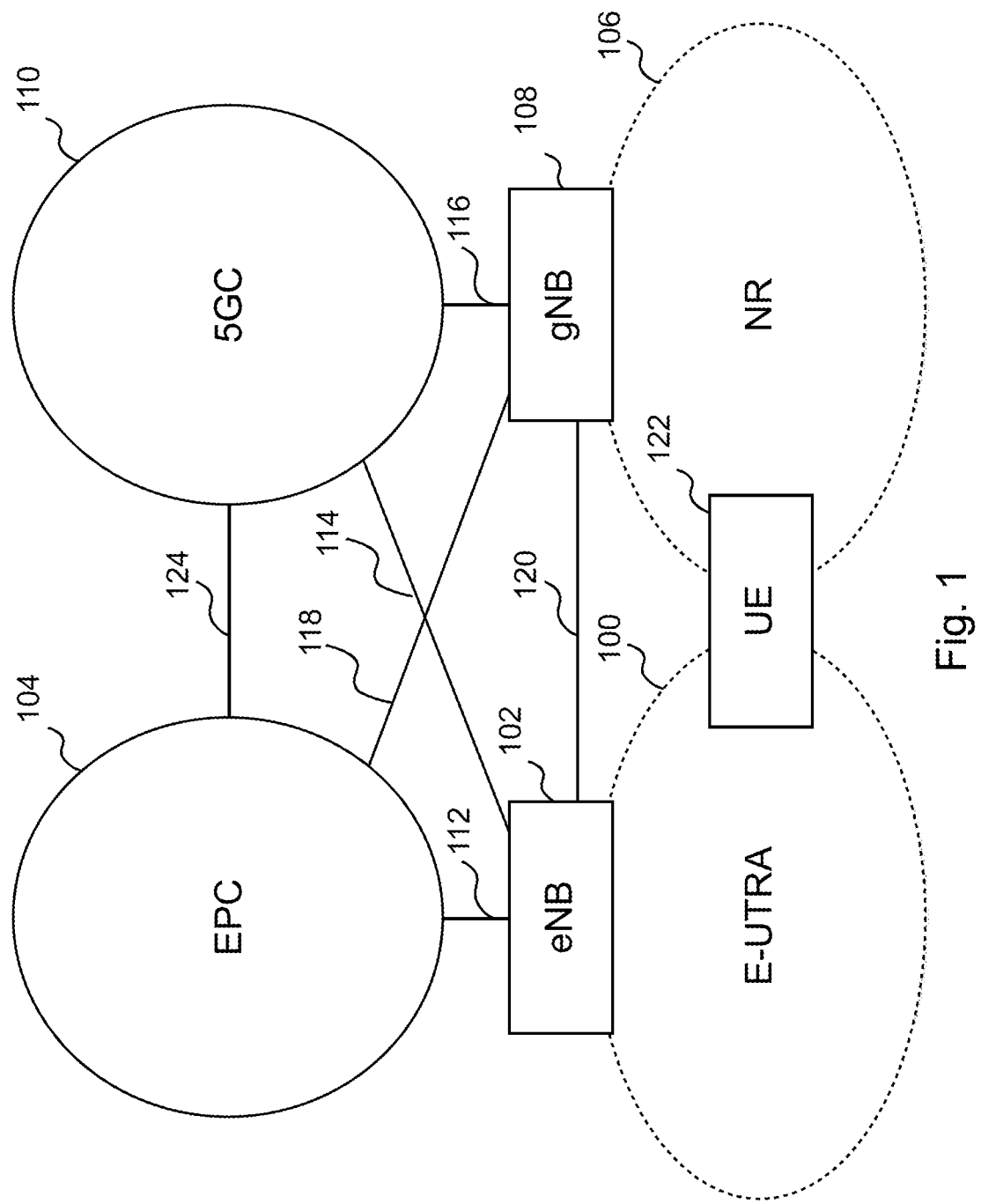
FIG. 1 illustrates a communications system according to an implementation of the present disclosure.

FIG. 1 illustrates a communications system according to an implementation of the present disclosure.

E-UTRA 100 is a radio access technology disclosed in Non-Patent Literature 3, and is composed of a cell group (Cell Group, CG) that is composed of one or more frequency bands. An eNB (E-UTRAN Node B) 102 is a base station device of E-UTRA. An EPC (Evolved Packet Core) 104 is a core network disclosed in Non-Patent Literature 14 and the like, and is designed as a core network for E-UTRA. An interface 112 between the eNB 102 and the EPC 104 includes a control plane (Control Plane, CP) through which control signals pass and a user plane (User Plane, UP) through which the user data passes.

An NR 106 is a radio access technology disclosed in Non-Patent Literature 9 and the like, and is composed of a cell group (Cell Group, CG) that is composed of one or more frequency bands. A gNB (g Node B) 108 is a base station device of NR. A 5GC 110 is a 5G core network disclosed in Non-Patent Literature 2 and the like, and is designed as a core network for NR, but may be used as an E-UTRA core network having a function of connecting to the 5GC. Hereinafter, the E-UTRA may include E-UTRA having a function of connecting to the 5GC.

An interface 114 between the eNB 102 and the 5GC 110, an interface 116 between the gNB 108 and the 5GC 110, an interface 118 between the gNB 108 and the EPC 104, an interface 120 between the eNB 102 and the gNB 108, and an interface 124 between the EPC 104 and the 5GC 110 are illustrated. The interface 114, the interface 116, the interface 118, the interface 120, and the interface 124 are interfaces that pass only the CP, pass only the UP, or pass both the CP and the UP. Furthermore, the interface 114, the interface 116, the interface 118, the interface 120, and the interface 124 may not exist depending on the communications system provided by the communications carrier.

The UE 122 is a terminal device corresponding to the E-UTRA or the NR, or corresponding to both the E-UTRA and the NR.

Figure 2:
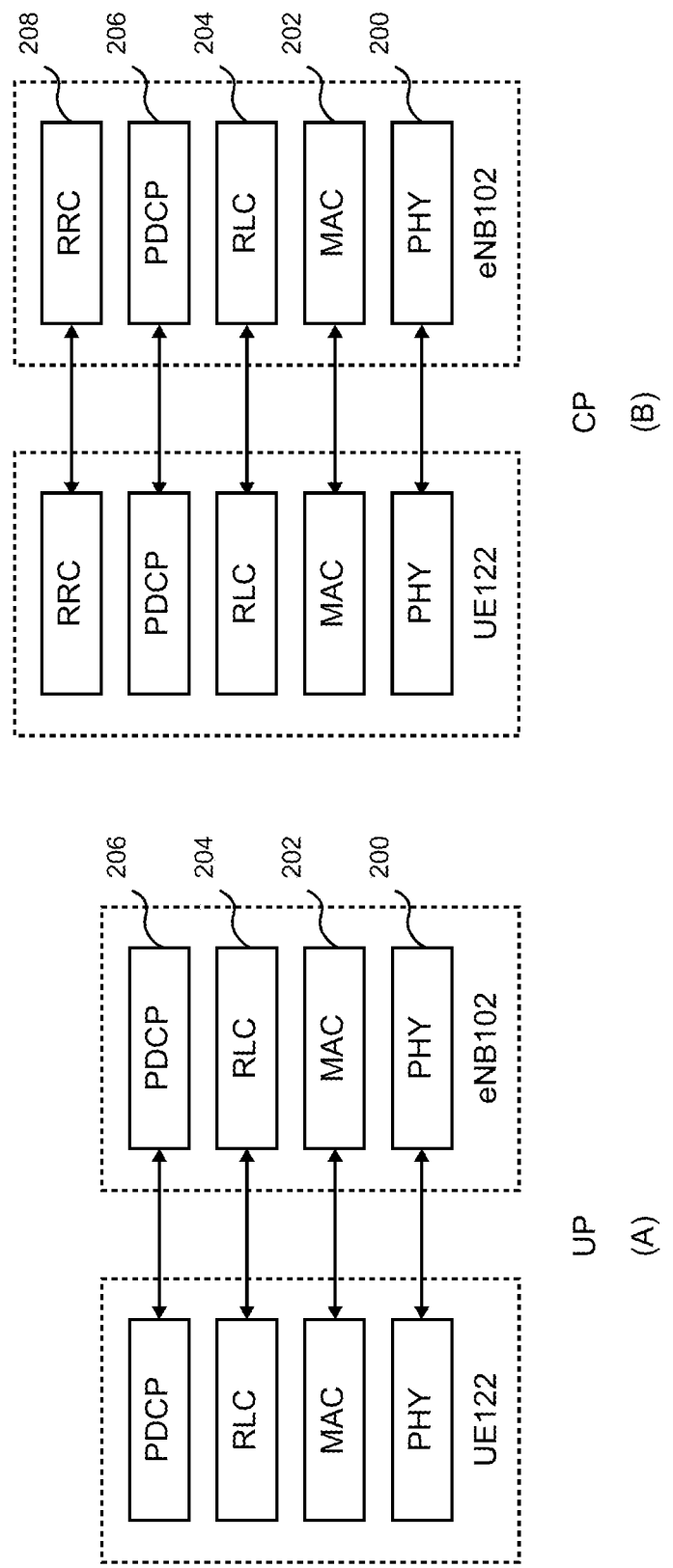
FIG. 2 illustrates a protocol stack of UP and CP of a terminal device and a base station device in E-UTRA according to an implementation of the present disclosure.

FIG. 2 illustrates a protocol stack of UP and CP of a terminal device and a base station device in E-UTRA according to an implementation of the present disclosure.

FIG. 2(A) is a block diagram illustrating a UP protocol stack used when the UE 122 communicates with the eNB 102.

PHY (Physical layer) 200 is a radio physical layer, and provides a transmission service to a higher layer using a physical channel. The PHY 200 is connected to a higher-order MAC (Medium Access Control layer) 202 disclosed subsequently via a transport channel. Data transports between the MAC 202 and the PHY 200 via the transport channel. Between the UE 122 and the PHY of the eNB102, data transmitting and receiving are performed via the radio physical channel.

The MAC 202 is a medium access control layer that maps various logical channels (LCHs) to various transport channels. The MAC 202 is connected to a higher-order RLC (Radio Link Control layer) 204 disclosed subsequently via a logical channel. Logical channels are generally classified, according to the type of transmission information, into control channels for transmitting control information and traffic channels for transmitting user information. The MAC 202 has a function of controlling the PHY 200 to perform intermittent transmission (DRX/DTX), a function of performing a random access procedure, a function of notifying transmission power information, a function of performing HARQ control, and the like. (Non-Patent Literature 7).

The RLC 204 is a radio link control layer which segments data received from a higher-order PDCP (Packet Data Convergence Protocol Layer) 206 disclosed subsequently, and adjusts the data size so that a lower layer may appropriately perform data transmission. Furthermore, the RLC 200 also has a function to ensure the QoS (Quality of service) of each data request. That is, the RLC 204 has functions such as data retransmission control (Non-Patent Literature 6).

The PDCP 206 is a packet data convergence protocol layer for efficiently transmitting an IP packet as user data in a radio section. The PDCP 206 may have a header compression function for compressing unnecessary control information. Furthermore, the PDCP 206 may also have a data encryption function (Non-Patent Literature 5).

Furthermore, the data processed in the MAC 202, the RLC 204, and the PDCP 206 are referred to as a MAC PDU (Protocol Data Unit), an RLC PDU, and a PDCP PDU, respectively. Furthermore, the data transported from a higher layer to the MAC 202, RLC 204, and PDCP 206 or the data transported to a higher layer is called MAC SDU (Service Data Unit), RLC SDU, and PDCP SDU, respectively.

FIG. 2(B) is a block diagram illustrating a CP protocol stack used when the UE 122 communicates with the eNB 102.

In the CP protocol stack, there exists an RRC (Radio Resource Control layer) 208 in addition to the PHY 200, the MAC 202, the RLC 204, and the PDCP 206. The RRC 208 is a radio link control layer that performs configuration and reconfiguration of a radio bearer (RB) and controls a logical channel, a transport channel, and a physical channel. The RB may be divided into a signaling radio bearer (SRB) and a data radio bearer (DRB). The SRB may be used as a path for transmitting an RRC message of control information. The DRB may be used as a path for transmitting user data. Each RB may be set between the eNB 102 and the RRC 208 of the UE 122 (Non-Patent Literature 4).

The disclosed functions of the MAC 202, the RLC 204, the PDCP 206, and the RRC 208 may be an example, and some or all of the functions may not be implemented. Furthermore, some or all of the functions of each layer may be included in another layer. Furthermore, the function of each layer of the MAC 202, the RLC 204, the PDCP 206, and the RRC 208, and/or the function of each layer may be referred to as an entity. That is, the MAC layer may be referred to as a MAC entity, the RLC layer may be referred to as an RLC entity, the PDCP layer may be referred to as a PDCP entity, and the RRC layer may be referred to as an RRC entity.

Furthermore, the IP layer, the Transmission Control Protocol (TCP) layer higher than the IP layer, the User Datagram Protocol (UDP) layer, and the application layer are layers higher than the PDCP layer (not illustrated in the figure). Furthermore, an RRC layer and a NAS (Non-Access String) layer also are layers higher than the PDCP layer (not illustrated in the figure). In other words, the PDCP layer is an RRC layer, a NAS layer, an IP layer, a TCP (Transmission Control Protocol) layer higher than the IP layer, a UDP (User Datagram Protocol) layer, and a lower layer of an application layer.

Figure 3:
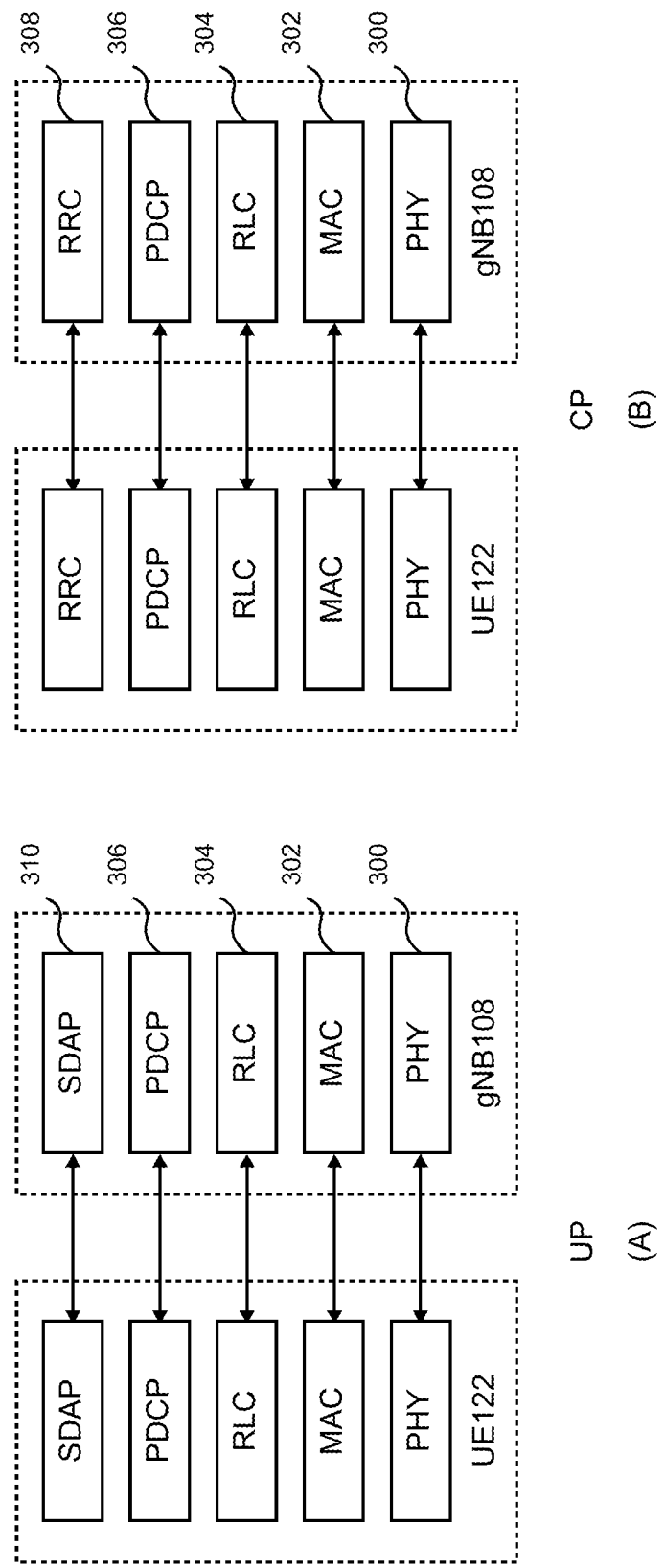
FIG. 3 illustrates a protocol stack of UP and CP of a terminal device and a base station device in NR according to an implementation of the present disclosure.

FIG. 3 illustrates a protocol stack of UP and CP of a terminal device and a base station device in NR according to an implementation of the present disclosure.

FIG. 3(A) is a block diagram illustrating a UP protocol stack used when the UE 122 communicates with the gNB 108.

It may also be that, PHY (Physical layer) 300 is a radio physical layer, and provides a transmission service to a higher layer using a physical channel. The PHY 300 is connected to a higher-order MAC (Medium Access Control layer) 302 (disclosed subsequently) via a transport channel. Data is transmitted between the MAC 302 and the PHY 300 via the transport channel. Between the UE 122 and the PHY of the gNB108, data transmitting and receiving are performed via the radio physical channel.

The MAC 302 is a medium access control layer that maps various logical channels (LCHs) to various transport channels. The MAC 302 is connected to a higher-order RLC (Radio Link Control layer) 304 (disclosed subsequently) via a logical channel. Logical channels are generally classified, according to the type of transmission information, into control channels for transmitting control information and traffic channels for transmitting user information. The MAC 302 has a function of controlling the PHY 300 to perform intermittent transmission (DRX/DTX), a function of performing a random access procedure, a function of notifying transmission power information, a function of performing HARQ control, and the like (Non-Patent Literature 13).

The RLC 304 is a radio link control layer which segments data received from a higher-order PDCP (Packet Data Convergence Protocol Layer) 306 disclosed subsequently, and adjusts the data size so that a lower layer may appropriately perform data transmission. Furthermore, the RLC 300 also has a function to ensure the QoS (Quality of service) of each data request. That is, the RLC 304 has functions such as data retransmission control (Non-Patent Literature 12).

The PDCP 306 is a packet data convergence protocol layer for efficiently transmitting an IP packet as user data in a radio section. The PDCP 306 may have a header compression function for compressing unnecessary control information. Furthermore, the PDCP 306 may also have a data encryption function (Non-Patent Literature 11).

An SDAP (Service Data Adaptation Protocol) 310 is a service data adaptation protocol layer, including the following functions: associating (mapping) a downlink QoS flow sent from a core network to a terminal device via a base station device with a DRB, and transmitting the downlink QoS flow from the terminal device to the base station device, and storing mapping rule information (Non-Patent Literature 16). When the terminal device receives the SDAP SDU and the QoS flow information from the higher layer at the same time, the terminal device assigns the SDAP SDU to the corresponding DRB based on the stored mapping rule of the QoS flow and the DRB. When the mapping rule of the QoS flow and the DRB is not stored, the SDAP SDU may be assigned to the default radio bearer (default DRB). A QoS flow is composed of one or more service data flows (SDF) that are processed via the same QoS policy (Non-Patent Literature 2). Furthermore, the SDAP may have a reflective QoS function of mapping the uplink QoS flow and the DRB based on the information of the downlink QoS flow. Furthermore, when the association rule of the QoS flow and the DRB is changed, by creating an end marker control PDU and transmitting such to the DRB prior to the change to, thereby, ensure that the in-sequence delivery of the SDAP SDU is performed (Non-Patent Literature 2 and 16).

The end marker control PDU is an SDAP control PDU disclosed in Non-Patent Literature 16, in which, this PDU is used to notify the SDAP entity of the UE of an end of a mapping. The mapping is between the QoS flow corresponding to the QoS flow identifier included in the QoS flow identifier field of this end marker PDU and the radio bearer that transmitted this PDU.

Furthermore, the IP layer, the Transmission Control Protocol (TCP) layer higher than the IP layer, the User Datagram Protocol (UDP) layer, and the application layer are layers higher than the SDAP layer (not illustrated in the figure). Furthermore, an RRC layer and a NAS (Non-Access String) layer also are layers higher than the SDAP layer (not illustrated in the figure). In other words, the SDAP layer is an RRC layer, a NAS layer, an IP layer, a TCP (Transmission Control Protocol) layer higher than the IP layer, a UDP (User Datagram Protocol) layer, and a lower layer of an application layer.

Furthermore, the data processed in the MAC 302, the RLC 304, the PDCP 306, and the SDAP 310 may be referred to as a MAC PDU (Protocol Data Unit), an RLC PDU, a PDCP PDU, and a SDAP PDU, respectively. Furthermore, the data transported from the higher layer to the MAC 302, the RLC 304, and the PDCP 306 or the data transported to the higher layer may be referred to as MAC SDU (Service Data Unit), RLC SDU, PDCP SDU, and SDAP SDU, respectively.

FIG. 3(B) is a block diagram illustrating a CP protocol stack used when the UE 122 communicates with the gNB 108.

In the CP protocol stack, there exists an RRC (Radio Resource Control layer) 308 in addition to the PHY 300, the MAC 302, the RLC 304, and the PDCP 306. The RRC 308 is a radio link control layer that performs configuration and reconfiguration of a radio bearer (RB) and controls a logical channel, a transport channel, and a physical channel. The RB may be divided into a signaling radio bearer (SRB) and a data radio bearer (DRB). The SRB may be used as a path for transmitting an RRC message of control information. The DRB may be used as a path for transmitting user data. Each RB may be set between the gNB 108 and the RRC 308 of the UE 122. Furthermore, the part of the RB composed of the RLC 304 and the MAC 302 may be referred to as an RLC bearer (Non-Patent Literature 10).

The previously-disclosed functions of the MAC 302, the RLC 304, the PDCP 306, the SDAP 310, and the RRC 308 may be an example, and some or all of the functions may not be implemented. Furthermore, some or all of the functions of each layer may be included in another layer. Furthermore, the function of each layer of the MAC 302, the RLC 304, the PDCP 306, the SDAP 310, and the RRC 308, and/or the function of each layer may be referred to as an entity. That is, the MAC layer may be referred to as a MAC entity, the RLC layer may be referred to as an RLC entity, the PDCP layer may be referred to as a PDCP entity, and the RRC layer may be referred to as an RRC entity.

Furthermore, in the implementations of the present disclosure, to distinguish the E-UTRA protocol and the NR protocol hereinafter, the MAC 202, the RLC 204, the PDCP 206, and the RRC 208 may be respectively referred to as a MAC for E-UTRA or a MAC for LTE, a RLC for E-UTRA or a RLC for LTE, a PDCP for E-UTRA or a PDCP for LTE, and a RRC for E-UTRA or a RRC for LTE. Additionally, the MAC 302, the RLC 304, the PDCP 306, and the RRC 308 may be referred to as a MAC for NR, a RLC for NR, a PDCP for NR, and a RRC for NR, respectively. Alternatively, the space may be disclosed with a space such as an E-UTRA PDCP or LTE PDCP, or NR PDCP.

Furthermore, as illustrated in FIG. 1, the eNB 102, the gNB 108, the EPC 104, and the 5GC 110 may be connected via an interface 112, an interface 116, an interface 118, an interface 120, and an interface 114. Therefore, in order to correspond to various communications systems, the RRC 208 of FIG. 2 may be replaced with the RRC 308 of FIG. 3. Furthermore, the PDCP 206 of FIG. 2 may be replaced with the PDCP 306 of FIG. 3. Furthermore, the RRC 308 of FIG. 3 may include the functions of the RRC 208 of FIG. 2. Furthermore, the PDCP 306 of FIG. 3 may be the PDCP 206 of FIG. 2.

Implementations

The implementations of the present disclosure are with reference to FIG. 1 to FIG. 10.

Figure 4:
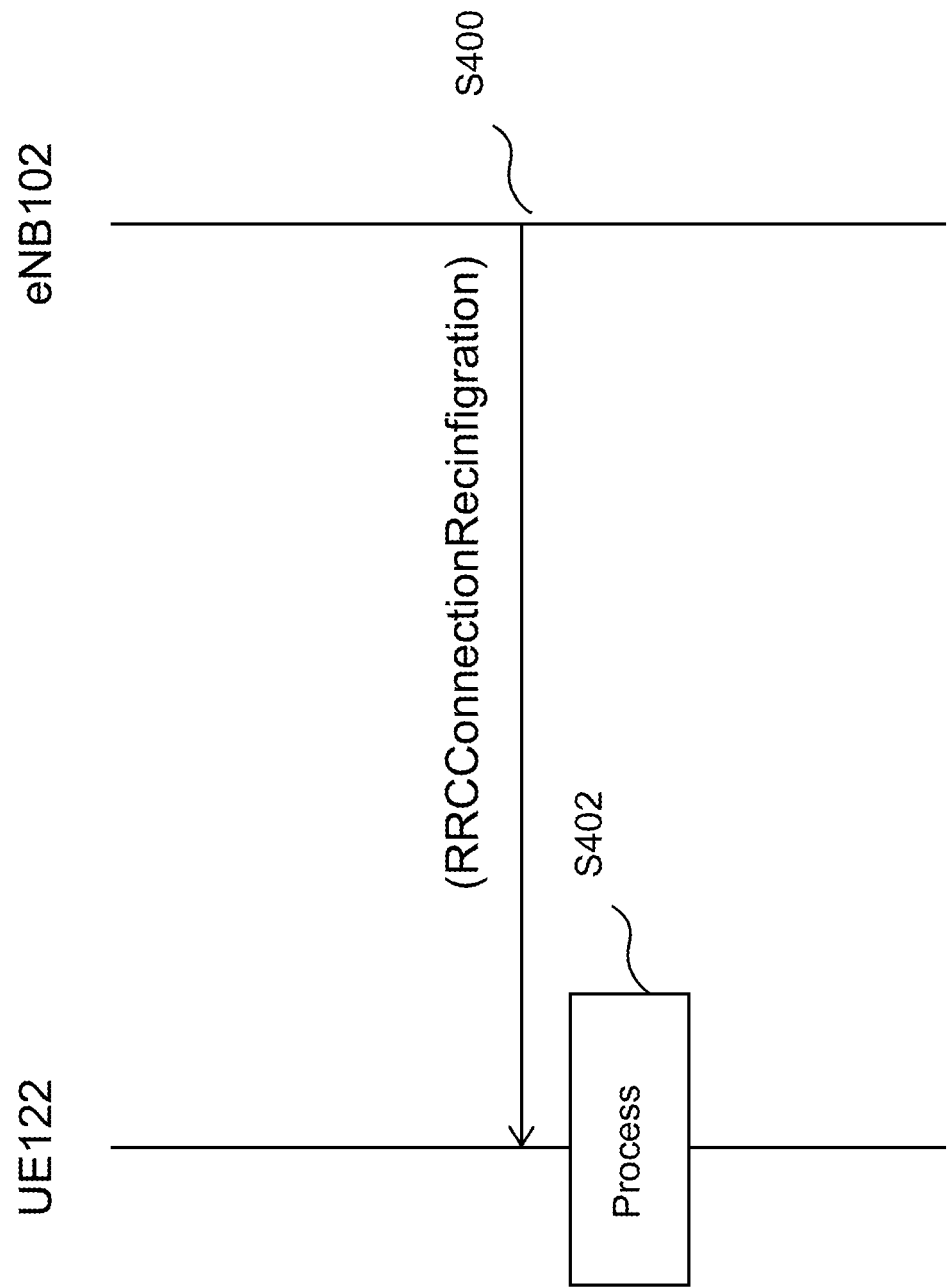
FIG. 4 illustrates an example flow of the RRC connection reconfiguration procedure according to an implementation of the present disclosure.

FIG. 4 illustrates an example flow of the RRC connection reconfiguration procedure according to an implementation of the present disclosure. Furthermore, the RRC connection reconfiguration procedure may also be a RRC reconfiguration procedure.

The RRC connection reconfiguration procedure, as disclosed in Non-Patent Literature 4, not only performs the settings for establishing, changing and releasing a radio bearer (RB) in LTE and changing and releasing a secondary cell in LTE, but also performs procedures of handover and measurement setting. On the other hand, the RRC reconfiguration procedure, as disclosed in Non-Patent Literature 10, not only performs the settings for establishment, changing, and releasing of an RB in NR and changing and releasing of a secondary cell in NR, but also performs procedures of handover (reconfiguration with synchronization) and measurement settings. Furthermore, in order to perform the previously-disclosed establishing, changing, releasing of an RB, and changing, releasing, handover of a secondary cell change, in the present disclosure, the information included in each message in the RRC connection reconfiguration procedure may be referred to as setting information. Furthermore, the setting information is not limited to the previously-disclosed setting, but may be another setting. It may not be limited to the RRC connection reconfiguration procedure, but also be included in each message in another procedure.

Furthermore, when in an MR-DC of the RRC connection reconfiguration procedure, particularly when the MR-DC is an EN-DC (E-UTRA-NR Dual Connectivity) with the core network being the EPC 104 and the master node being the eNB 102 (may be referred to as an extended eNB 102) (Option 3 and Option 3a disclosed in Non-Patent Literature 17); when the MR-DC is NGEN-DC (NG-RAN E-UTRA-NR Dual Connectivity) with the core network being 5GC 110 and the master node being eNB102 (Option 7 and Option 7a disclosed in Non-Patent Literature 17); and when the eNB 102 (extended eNB) uses 5GC as a E-UTRA/5GC of the core network (Option 5 disclosed in Non-Patent Literature 17); the RRC connection reconfiguration procedure includes not only the LTE configuration information, but also the configuration information of NR as disclosed in Non-Patent Literature 10. In each implementations of the present disclosure, to avoid complicating the descriptions, the descriptions will be made with the term of an RRC connection reset procedure, and use the eNB 102 as a base station device. Furthermore, the architecture terms such as EN-DC, NGEN-DC, and E-UTRA/5GC are not limited to the terms disclosed previously, and may be referred to as other terms.

In the RRC connection reconfiguration procedure, the UE 122 receives an RRC connection reconfiguration message (RRCCConnectionReconfiguration) from the eNB 102 (Step S400), and performs various configurations, for example, processes of a radio bearer configuration, according to the configuration information included in the RRC connection reconfiguration message (Step S402). Subsequent to Step S402, the UE 122 may send an RRC connection reconfiguration completion message (RRCConnectionReconfigurationComplete) to the eNB 102 (not illustrated in the figures). Furthermore, the RRC connection reconfiguration message may be rephrased as RRC connection reconfiguration, and the RRC connection reconfiguration complete message may also be rephrased as RRC connection reconfiguration completed.

Figure 5:
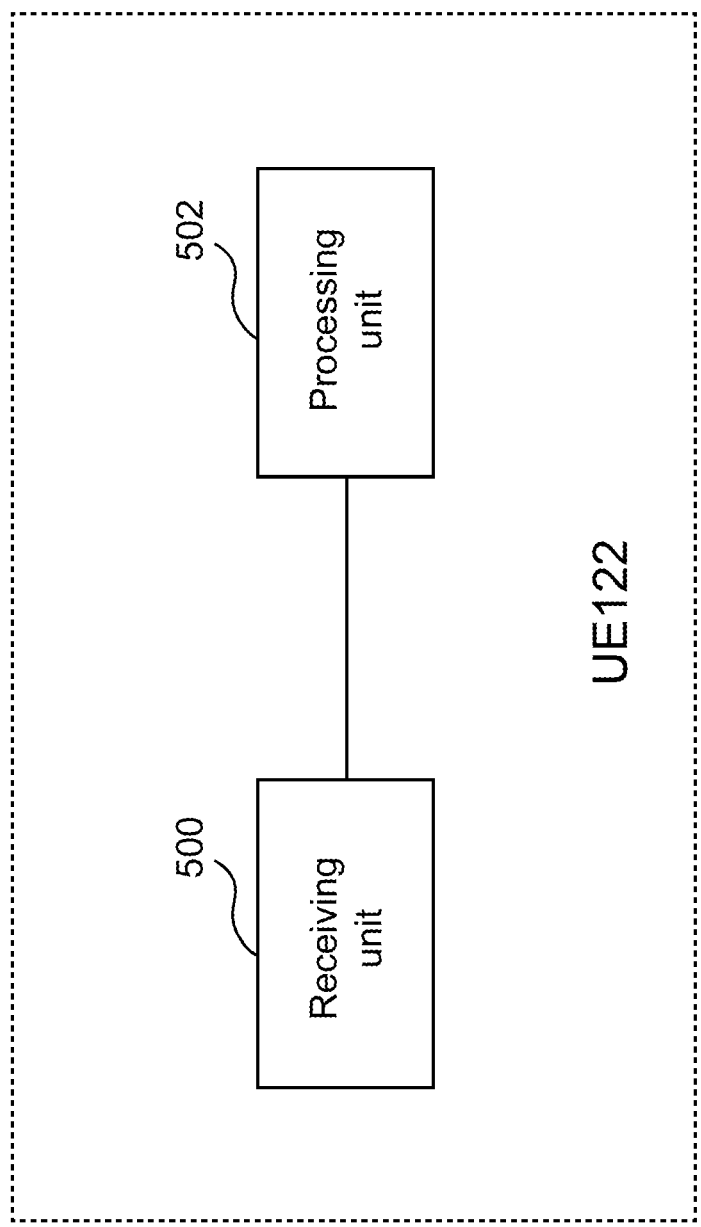
FIG. 5 illustrates a configuration of a terminal device according to an implementation of the present disclosure.

FIG. 5 illustrates a configuration of a terminal device according to an implementation of the present disclosure. Furthermore, to avoid complicating the descriptions, FIG. 5 illustrates only the main components that are closely associated to the implementation of the present disclosure.

In FIG. 5, the UE 122 includes: a receiving unit 500 that receives an RRC connection reconfiguration message from the eNB 102, and a processing unit 502 that performs processing according to the reconfiguration information included in the received message.

Figure 6:
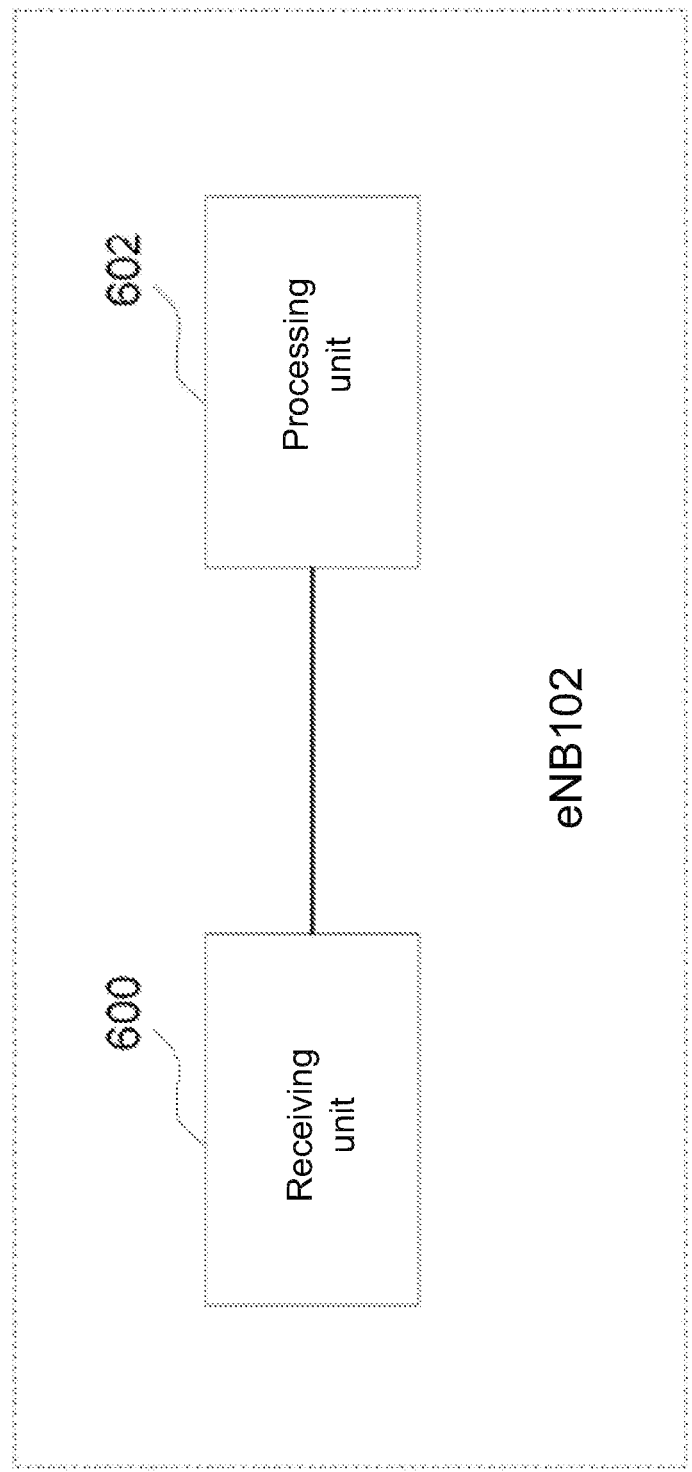
FIG. 6 illustrates a configuration of a base station device according to an implementation of the present disclosure.

FIG. 6 illustrates a configuration of a base station device according to an implementation of the present disclosure. Furthermore, to avoid complicating the descriptions, FIG. 6 illustrates only the main components that are closely associated to the implementation of the present disclosure.

In FIG. 6, the eNB 102 includes: a transmission unit 600 that transmits an RRC connection reconfiguration message to the UE 122, and a processing unit 602 that creates an RRC connection reconfiguration message including various configuration information, and transmits the RRC connection reconfiguration message to the UE 122 to cause the processing unit 502 to perform processing. Furthermore, the architecture illustrated in FIG. 6 may also be applied to gNB 108. When applied to gNB 108, the message transmitted from the transmitting unit 600 to the UE 122 may be an RRC reconfiguration message.

FIG. 7 illustrates a first portion of ASN.1 (Abstract Syntax Notation One) and information related to the radio bearer setting in an implementation of the present disclosure. FIG.

8 illustrates a second portion of the ASN.1 illustrated in FIG. 7. In 3GPP, the specifications related to RRC (Non-Patent Literature 4, Non-Patent Literature 10) describe messages and configuration information using ASN.1. The configuration information of ASN.1 includes fields and information elements (IE). In the ASN.1 example in FIG. 7 and FIG. 8, <abbreviation> and <omission> indicate other information are omitted, and do not indicate omitting the part of descriptions relating to ASN.1. Furthermore, where there is no <abbreviation> or <omission> notations, the information may be omitted. Furthermore, the ASN.1 example of FIG. 7 and FIG. 8 does not correctly depict an example of ASN.1, but illustrates an example of the configuration information of the RRC connection reconfiguration in the present disclosure and other terms and representations may be used for fields and information. Furthermore, the ASN.1 example of FIG. 7 and FIG. 8 illustrate only the main components that are closely associated to the implementation of the present disclosure to avoid complicating the descriptions.

In FIG. 7, the configuration information included in the RRC connection reconfiguration (RRCConnectionReconfiguration) is represented using the notation "::=SEQUENCE". Moreover, in FIG. 7, the configuration information included in the RRC connection reconfiguration includes configuration info illation represented by a radioResourceConfigDedicated field and configuration information represented by a fullConfig field. When respective configuration is required, that is, an OPTIONAL may be set and included as configuration information for RRC connection reconfiguration. The details of the radioResourceConfigDedicated field may also be indicated by an information element represented by RadioResourceConfigDedicated. Furthermore, the configuration information represented by the fullConfig field may be configuration information indicating that the full configuration is applied at the time of handover or after the re-establishment of the radio bearer, or may be "true" when the full configuration is applied.

Furthermore, in FIG. 7, the information element represented by RadioResourceConfigDedicated may be used for establishment (setup), change (modify), release, and/or setting of a MAC entity of a radio bearer. In FIG. 7, the information element represented by RadioResourceConfigDedicated includes configuration information represented by a srb-ToAddModList field and a drb-ToAddModList field. When respective configuration is required, that is, as an option, the fields may be set accordingly and included in the configuration information of the information element represented by RadioResourceConfigDedicated. The details of the srb-ToAddModList field and the drb-ToAddModList field may be further indicated by an information element represented by SRB-ToAddModList and an information element represented by DRB-ToAddModList.

As illustrated in FIG. 7, the info illation element represented by SRB-ToAddModList is a list of information elements represented by SRB-ToAddMod, and the information element represented by SRB-ToAddMod is configuration information related to the added or modified SRB. Furthermore, as illustrated in FIG. 7, the information element represented by the SRB-ToAddMod may include the configuration information represented by the srb-Identity field, and the configuration information represented by the srb-Identity field may be an SRB identifier that uniquely identifies the SRB and may take a value of 1 or 2.

Furthermore, as illustrated in FIG. 8, the information element represented by DRB-ToAddModList is a list of information elements represented by DRB-ToAddMod, and the information element represented by DRB-ToAddMod is configuration information related to the added or modified DRB. Furthermore, as illustrated in FIG. 8, the information element represented by the DRB-ToAddMod may include the configuration information represented by the srb-Identity field, and the configuration information represented by the drb-Identity field may be a DRB identifier that uniquely identifies the DRB and may be any integer from 1 to 32. For DC, the DRB identifier may be specific in the UE 122 coverage.

Furthermore, as illustrated in FIG. 8, the information element represented by the DRB-ToAddMod may optionally include an eps-BearerIdentity field, and the configuration information represented by the eps-BearerIdentity field may be an Evolved Packet System (EPS) bearer identifier for uniquely identifying the EPS bearer used by the EPC 104 as disclosed in Non-Patent Literature 3, which may be any integer from 0 to 15. Furthermore, the correspondence information between the EPS bearer identifier and the DRB identifier as disclosed previously may also be held in the UE 122.

Furthermore, as illustrated in FIG. 8, the information element represented by the DRB-ToAddMod may optionally include a pdcp-Config field and configuration information represented by a PDCP-Config information element, and the pdcp-Config field and configuration information represented by the PDCP-Config information element may be information related to the configuration of the PDCP entity. Furthermore, the configuration information represented by the pdcp-Config field and the PDCP-Config information element included in the RRC connection reconfiguration message may be the configuration information of the E-UTRA PDCP entity. In other words, the RRC connection reconfiguration message that includes the pdcp-Config field and the configuration information represented by the information element PDCP-Config may also indicated that an E-UTRA PDCP is configured.

Furthermore, as illustrated in FIG. 8, the information element represented by the DRB-ToAddMod may optionally include an rlc-Config field and configuration information represented by an RLC-Config information element, and the rlc-Config field and configuration information represented by the RLC-Config information element may be information related to the configuration of the RLC entity.

Furthermore, as illustrated in FIG. 8, the information element represented by the DRB-ToAddMod may optionally include a logicalChannelConfig field and configuration information represented by a LogicalChannelConfig information element, and the logicalChannelConfig field and the configuration information represented by the LogicalChannelConfig information element may be information related to the configuration of a DTCH (Dedicated Traffic Channel) logical channel. Furthermore, the information element represented by DRB-ToAddMod may include configuration information represented by a logicalChannelIdentity field. The configuration information represented by the logicalChannelIdentity field may be a logical channel identifier that uniquely identifies the DTCH logical channel, and may be any integer from 3 to 10.

Figure 9:
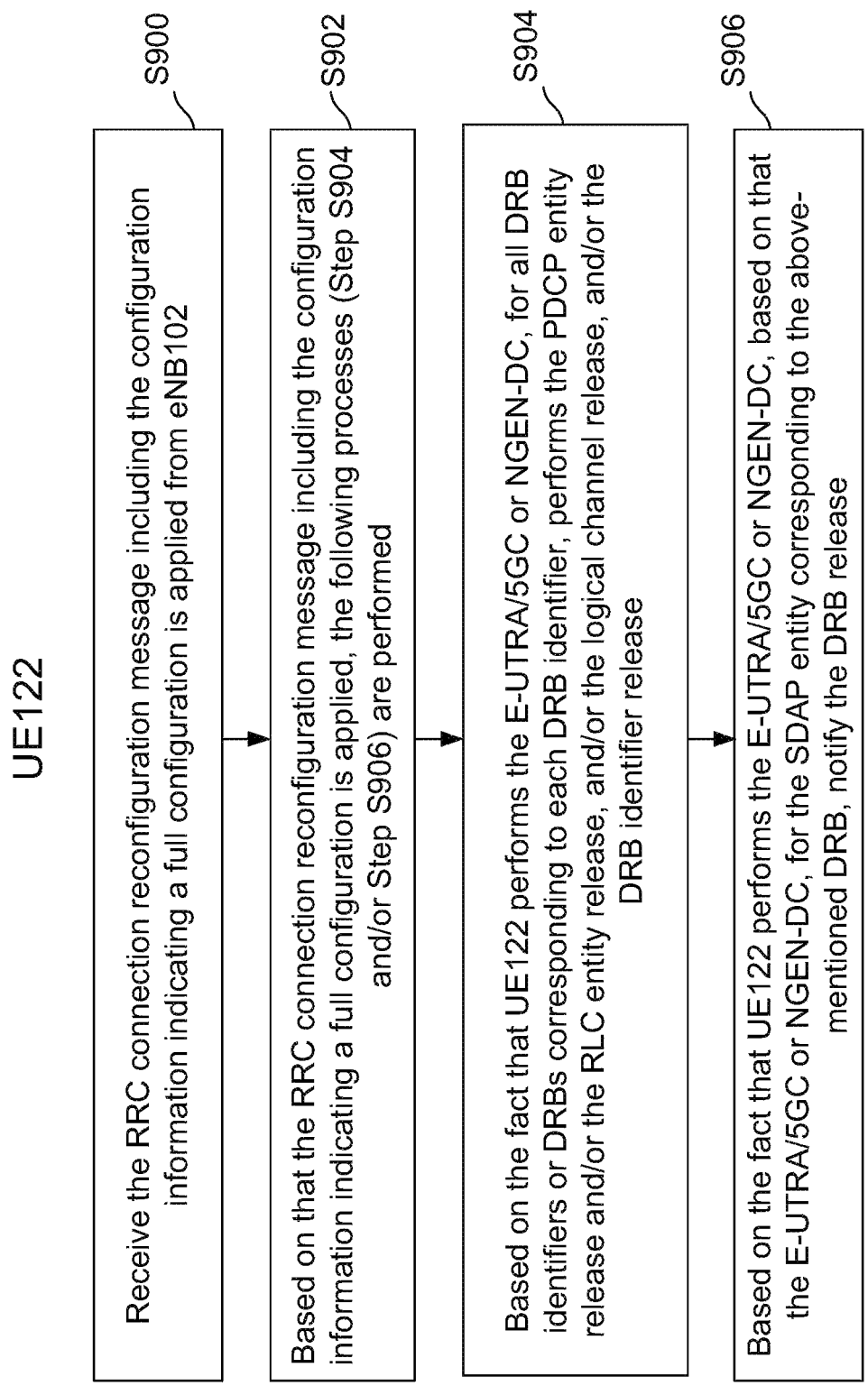
FIG. 9 illustrates a processing method according to an implementation of the present disclosure.

An example of a processing method of the UE 122 according to the implementation of the present disclosure will be disclosed with reference to FIG. 9. FIG. 9 illustrates a processing method according to an implementation of the present disclosure.

The processing unit 602 of the eNB 102 creates an RRC connection reconfiguration message, and transmits from the transmission unit 600 to the UE 122 (not illustrated in the figures). Wherein, the RRC connection reconfiguration message includes configuration information representing that the full configuration is applied, specifically, a fullConfig field. The receiving unit 500 of UE 122 receives the RRC connection reconfiguration message including the fullConfig field from the eNB 102 (Step S900).

Subsequently, the processing unit 502 of the UE 122 confirms that the RRC connection reconfiguration message includes the configuration information representing that the full configuration is applied, that is, the fullConfig field. Based on that the field is included, the following processes (the processes of Step S904 and/or Step S906 disclosed subsequently) are performed (Step S902).

The processing unit 502 of the UE 122 when the E-UTRA/5GC or NGEN-DC is being performed, based on the fact that the E-UTRA/5GC or NGEN-DC is performed, for all DRB identifiers or DRBs corresponding to each DRB identifier, performs the PDCP entity release and/or the RLC entity release, and/or the logical channel release, and/or the DRB identifier release (Step S904).

Furthermore, at Step S904, the PDCP entity release may be the NR PDCP entity release. Furthermore, at Step S904, the RLC entity may be re-established before the PDCP entity release. Furthermore, at Step S904, the logical channel may be a DTCH logical channel. Furthermore, at Step S904, the MCG security configuration may be released. The previously-disclosed the MCG security configuration release may be performed based on the core network performing a handover with a change from the 5GC 110 to the EPC 104 or a redirection from the 5GC 110 to the EPC 104. A determination may be made based on the previously-disclosed RRC connection reconfiguration or configuration information related to RRC reestablishment for NR included in the RRC connection reconfiguration not including the core network performing a handover with a change from the 5GC 110 to the EPC 104 or a redirection from the 5GC 110 to the EPC 104. A determination may be made based on the previously-disclosed RRC connection reconfiguration or configuration information related to RRC reestablishment for NR included in the RRC connection reconfiguration including the core network performing a handover with a change from the 5GC 110 to the EPC 104 or a redirection from the 5GC 110 to the EPC 104. Furthermore, a determination that the core network performing a handover with a change from the 5GC 110 to the EPC 104 or a redirection from the 5GC 110 to the EPC 104 may be performed based on configuration information related to DRB to be added or changed included in the RRC connection reconfiguration message disclosed previously, specifically, when the information on the configuration of the PDCP entity is included in the DRB-ToAddModList or the DRB-ToAddMod when the pdcp-Config or the PDCP-Config is included, specifically, when the E-UTRA PDCP entity is set.

Furthermore, the processing unit 502 of the UE 122, when the E-UTRA/5GC or NGEN-DC is performed, based on the E-UTRA/5GC or NGEN-DC, for the SDAP entity corresponding to the previously-disclosed DRB, may notify the DRB release (Step S906). Furthermore, the processing unit 502 of the UE 122, when the E-UTRA/5GC or NGEN-DC is performed, based on that the E-UTRA/5GC or NGEN-DC, for all the DRB identifiers set in the UE 122 or the DRBs corresponding to each DRB identifier, after performing the DRB release, specifically, after completing the process of Step S904, may release all the SDAP entities set in the UE 122.

Furthermore, the processing unit 502 of the UE 122 may, based on the RRC connection reconfiguration message including the fullConfig field, perform E-UTRA/5GC or NGEN-DC. Based on the E-UTRA/5GC or NGEN-DC being performed, the processing unit 502 performs releasing and/or clearing of all dedicated radio configuration information other than C-RNTI (Cell Radio Network Temporary Identifier) configuration information. In addition to the C-RNTI, there may exist configuration information that is not the subject of the releasing and/or clearing processing disclosed previously. Also, the C-RNTI may be released. Furthermore, the determination of which configuration information is excluded from the releasing and/or clearing processing may be determined based on whether the full configuration is applied with a change of the core network. For example, the MCG security configuration may be excluded from the above releasing and/or clearing processing based on a full configuration without changing the core network or a full configuration within the 5GC core network. Furthermore, the determination of the previously-disclosed full configuration without a change of the core network or the full configuration within the 5GC core network may be made based on the previously-disclosed RRC connection reconfiguration or configuration information related to RRC reestablishment for NR included in the RRC connection reconfiguration including configuration information of the core network without a change or configuration information within the 5GC 110. The determination may also be made based on the previously-disclosed RRC connection reconfiguration or the configuration information related to RRC reestablishment for NR included in the above RRC connection reconfiguration not including the configuration information representing that the change is from 5GC 110 to EPC 104. Furthermore, a determination that the core network is performing handover with a change from the 5GC 110 to the EPC 104 or a redirection from the 5GC 110 to the EPC 104 may be performed based on configuration information related to DRB to be added or changed included in the RRC connection previously disclosed reconfiguration message, specifically, when the information on the configuration of the PDCP entity is included in the DRB-ToAddModList or the DRB-ToAddMod, such as when the pdcp-Config or the PDCP-Config is not included, and the NR PDCP entity is set.

Furthermore, the processing unit 502 of the UE 122, based on the RRC connection reconfiguration message including the fullConfig field, for the SRB corresponding to each srb-Identity value included in the srb-ToAddModList included in the RRC connection reconfiguration message, and based on the UE 122 performing E-UTRA/5GC or NGEN-DC, performs the NR PDCP entity release and the E-UTRA PDCP entity establishment.

Figure 10:
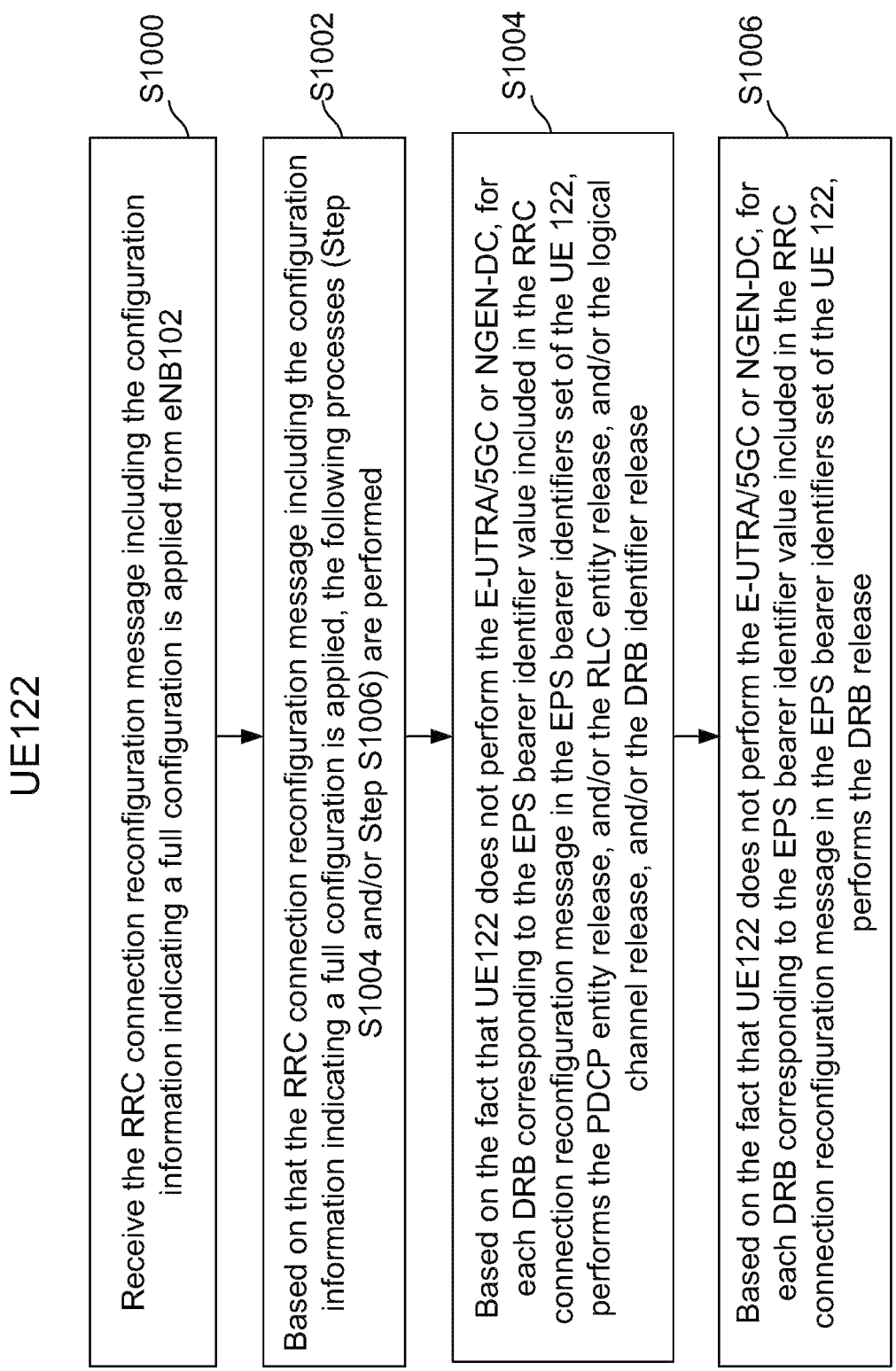
FIG. 10 illustrates a processing method according to an implementation of the present disclosure.

Another example of the processing method of UE 122 according to the present disclosure will be disclosed with reference to FIG. 10. FIG. 10 illustrates a processing method according to an implementation of the present disclosure.

The processing unit 602 of the eNB 102 creates an RRC connection reconfiguration message including configuration information representing that the full configuration is applied, specifically, a fullConfig field that causes the UE 122 to perform processing, and transmits the RRC connection reconfiguration message from the transmission unit 600 to the UE 122 (not illustrated in the figure). The receiving unit 500 of the UE 122 receives the RRC connection reconfiguration message from the eNB 102 (Step S1000).

Subsequently, the processing unit 502 of the UE 122 conforms that the RRC connection reconfiguration message includes the configuration information indicating that the full configuration is applied, specifically, that the RRC connection reconfiguration message includes the fullConfig field. Based on the included field is, the following processes (the processes of Step S1004 and/or Step S1006 disclosed subsequently) are performed (Step S1002).

The processing unit 502 of the UE 122, for each DRB corresponding to the EPS bearer identifier value included in the RRC connection reconfiguration message in the EPS bearer identifiers set of the UE 122, performs the PDCP entity release, and/or the RLC entity release, and/or the logical channel release, and/or the DRB identifier release (Step S1004). Furthermore, the processing in Step S1004 disclosed previously may be performed based on the UE 122 not performing E-UTRA/5GC or NGEN-DC.

Furthermore, at Step S1004, the PDCP entity release may be rephrased as the NR PDCP entity release or the E-UTRA PDCP entity release. Furthermore, at Step S1004, the PDCP entity release may be rephrased as the E-UTRA PDCP entity release when the previously-disclosed DRB is configured with an E-UTRA PDCP entity, and otherwise, specifically, when the previously-disclosed DRB is configured with the NR PDCP entity, it may be rephrased as the NR PDCP entity release. Furthermore, before releasing the NR PDCP entity, the RLC entity may be re-established.

Furthermore, the processing unit 502 of the UE 122 performs a DRB release process on each DRB corresponding to the EPS bearer identifier value not included in the RRC connection reconfiguration message in the EPS bearer identifiers set in the UE 122 (Step S1006). Furthermore, the process of previously disclosed Step 1006 may be performed based on the UE 122 not performing E-UTRA/5GC or NGEN-DC. Furthermore, at Step S1006, the DRB release process is a process of releasing the NR PDCP entity when the E-UTRA PDCP entity is not configured in the DRB, specifically, when the NR PDCP entity is configured. Furthermore, before releasing the NR PDCP entity, the RLC entity may be re-established.

Furthermore, the processing unit 502 of the UE 122, based on that the full configuration field included in the RRC connection reconfiguration message, for the corresponding SRB value of each srb-Identity included in the srb-ToAdd-ModList included in the RRC connection reconfiguration message, and based on the UE 122 not performing E-UTRA/5GC or NGEN-DC, or based on the configuration information such as no change in the security key, releases the NR PDCP entity, establishes the UTRA PDCP, and adapts the security configuration for the UE 122.

Furthermore, the radio bearer configuration in each implementation of the present disclosure may be included not only in the RRC connection reconfiguration procedure, but also in the RRC connection establishment procedure, and the RRC connection re-establishment procedure. Furthermore, in each implementation of the present disclosure, DRB may be referred to as SRB, or SRB may be referred to as DRB. Furthermore, DRB and/or SRB may be referred to as a radio bearer.

Furthermore, according to the present disclosure, when a change of the core network is involved, for example, when a change from the 5GC 110 to the EPC 104 or a change from the EPC 104 to the 5GC 110 is performed, the radio bearer release process and radio bearer addition process are performed via a RRC connection reconfiguration message and/or a RRC reconfiguration message. That is, the configuration information related to release of all radio bearers or DRBs set in the terminal device and the configuration information related to radio bearers or DRBs to be added to the terminal device may include a RRC connection reconfiguration message and/or a RRC reconfiguration message. Furthermore, the same radio bearer identifier may also be used.

According to the present disclosure, the full configuration is performed by taking the MR-DC into consideration, which may reduce the complexity of protocol processing and perform the communication between the base station device and the terminal device efficiently.

The program that operates on the device according to the present disclosure may be a program that controls a Central Processing Unit (CPU), and cause a computer to realize the functions according to the present disclosure. The program or information handled by the program may be temporarily read into a volatile memory such as a Random Access Memory (RAM) during processing, or stored in a non-volatile memory such as a flash memory or a Hard Disk Drive (HDD), and is read, corrected and written by the CPU as required.

Additionally, a part of the device in the present disclosure may be realized by a computer. A program for implementing the disclosed functions may be recorded on a computer-readable storage medium. The program may cause a computer system to read and execute the program recorded on the recording medium. Herein, the "computer system" is a computer system built in the device, and includes an operating system and hardware such as peripheral devices. Furthermore, the "computer-readable storage medium" may be any of a semiconductor storage medium, an optical storage medium, a magnetic storage medium, and the like.

Furthermore, a "computer-readable storage medium" may include: a medium that dynamically stores a program for a short time, such as a communication line for transmitting a program through a network like the Internet or a telephone line. In this situation, a program holding a program for a certain period of time, such as a volatile memory in a computer system serving as a server or a client, may also be included. Furthermore, the previously-disclosed program may be for performing a portion of the disclosed functions, or may be for performing the disclosed functions in combination with a program that is already recorded in a computer system.

Furthermore, various characteristics or function modules used in the disclosed equipment may be installed or implemented by circuits, typically a monolithic or multiple-chip integrated circuit. The electronics designed for implementing the functions disclosed herein may include general processors, a digital signal processor (DSP), Applications Specific Integrated Circuitry (ASIC), Field Programmable Gate Arrays (FPGAs) or any other programmable logic devices, discrete gate or transistor logic, discrete hardware assembly, or any combination of the disclosed devices. A general processor may be a microprocessor, or any present processor, controller, microcontroller, or state machine. The disclosed electronics may be digital electronics or analog electronics. As semiconductor technology continues to improve, it is noted that there may be new integrated circuit technology replacing present integrated circuits, one or more implementations of the present disclosure may be implemented with the new integrated circuit technology.

Furthermore, the present disclosure is not limited to the disclosed implementations. Although various examples are disclosed in each implementation, it should be noted that the present disclosure is not limited thereto. Fixed or non-mobile electronic equipment installed indoor or outdoor may be in a form of terminal equipment or communications equipment. For example, the electronic equipment may be Audio-Video equipment, kitchen equipment, cleaning equipment, air-conditioner, office equipment, vending machines, other home appliances, terminal devices or communications devices.

The implementations of the present disclosure are disclosed in detail with reference to the accompanying drawings. However, the implementations are not limited to the disclosed implementations. The present disclosure also includes design variations without departing from the scope or spirit of the disclosed concepts. Furthermore, the present disclosure also encompasses modifications within the scope of the claims, implementations suitably combining various disclosed implementations. Additionally, the disclosed implementations may have component substitutions that have similar effect.

What is claimed is:

1. A terminal device for communicating with a base station device, the terminal device comprising:
   a receiving unit that receives a Radio Resource Control (RRC) connection reconfiguration message from the base station device; and
   a processing unit that performs one or more processes when the RRC connection reconfiguration message includes information indicating that a full configuration is applied, on the basis that the terminal device performs an Evolved Universal Terrestrial Radio Access/5G Core Network (E-UTRA/5GC) or NG Radio Access Network (NG-RAN E-UTRA)-New Radio (NR) Dual Connectivity (NGEN-DC) for each Data Radio Bearer (DRB) corresponding to a DRB identifier set by the terminal device,
   the one or more processes comprising:
      performing at least one of an NR Packet Data Convergence Protocol (PDCP) entity release, a Radio Link Control (RLC) entity release, a logical channel release and a DRB identifier release,
      performing a notification of Service Data Adaptation Protocol (SDAP) entity corresponding to the DRB of the DRB release, and
      performing an RLC entity re-establishment.

2. A terminal device for communicating with a base station device, the terminal device comprising:
   a receiving unit that receives a Radio Resource Control (RRC) connection reconfiguration message from the base station device; and,
   a processing unit that performs one or more processes when the RRC connection reconfiguration message includes information indicating that full configuration is applied, on the basis that the terminal device does not perform an Evolved Universal Terrestrial Radio Access/5G Core Network (E-UTRA/5GC) or NG Radio Access Network (NG-RAN E-UTRA)-New Radio (NR) Dual Connectivity (NGEN-DC),
   the one or more processes for each Data Radio Bearer, DRB, corresponding to an Evolved Packet System, EPS, bearer identifier value included in the RRC connection reconfiguration message that is set in the EPS bearer identifier value of the terminal device comprising:
      performing an E-UTRA Packet Data Convergence Protocol (PDCP) entity release or a New Radio (NR) PDCP entity release,
      performing a Radio Link Control (RLC) entity release, a logical channel release and a DRB identifier release, and
      performing a RLC entity re-establishment,
   the one or more processes for each DRB corresponding to a EPS bearer identifier value not included in the RRC connection reconfiguration message that is set in the EPS bearer identifier value of the terminal device comprising:
      performing a DRB release.

3. The terminal device according to claim 2, wherein performing the DRB release comprisessing:
   performing the E-UTRA PDCP entity release when the DRB is set with E-UTRA PDCP entity; and
   performing a New Radio (NR) Packet Data Convergence Protocol (PDCP) entity release when the DRB is not set with E-UTRA PDCP entity.

4. A method performed by a terminal device for communicating with a base station device, the method comprising:
   receiving a Radio Resource Control (RRC) connection reconfiguration message from the base station device; and
   performing one or more processes when the RRC connection reconfiguration message includes information indicating that full configuration is applied, on the basis that the terminal device performs an Evolved Universal Terrestrial Radio Access/5G Core Network (E-UTRA/5GC) or NG Radio Access Network (NG-RAN E-UTRA)-New Radio (NR) NR Dual Connectivity (NGEN-DC),
   the one or more processes, for each Data Radio Bearer (DRB) corresponding to a DRB identifier set by the terminal device, comprising:
      performing a New Radio (NR) Packet Data Convergence Protocol (PDCP) entity release, a Radio Link Control (RLC) entity release, a logical channel release and a DRB identifier release,
      performing a notification of Service Data Adaptation Protocol (SDAP) entity corresponding to the DRB of the DRB release, and
      performing a RLC entity re-establishment.

5. A method performed by a terminal device for communicating with a base station device, the method comprising:
   receiving a Radio Resource Control (RRC) connection reconfiguration message from the base station device; and
   performing one or more processes when the RRC connection reconfiguration message includes information indicating that full configuration is applied, on the basis that the terminal device does not perform an Evolved Universal Terrestrial Radio Access/5G Core Network (E-UTRA/5GC) or NG Radio Access Network (NG-RAN E-UTRA)-New Radio (NR) Dual Connectivity (NGEN-DC),
   the one or more processes for each Data Radio Bearer (DRB) corresponding to an Evolved Packet System (EPS) bearer identifier value included in the RRC connection reconfiguration message that is set in the EPS bearer identifier value of the terminal device comprising:
      performing an E-UTRA Packet Data Convergence Protocol (PDCP) entity release or a New Radio (NR) PDCP entity release,
      performing a Radio Link Control (RLC) entity release, a logical channel release and a DRB identifier release, and
      performing a RLC entity re-establishment, and
   the one or more processes for each DRB corresponding to the EPS bearer identifier value not included in the RRC connection reconfiguration message that is set in the EPS bearer identifier value of the terminal device comprising:
      performing a DRB release.

6. The method according to claim 5, wherein performing the DRB release comprising:
   performing the E-UTRA PDCP entity release, when the DRB is set with E-UTRA PDCP entity; and
   performing a NR PDCP entity release, when the DRB is not set with E-UTRA PDCP entity.

* * * * *